United States Patent [19]
Hwang et al.

[11] Patent Number: 6,011,233
[45] Date of Patent: Jan. 4, 2000

[54] WELDING METHOD OF A CONNECTION TERMINAL PIECE FOR A DEFLECTION YOKE COIL AND THE STRUCTURE THEREOF

[75] Inventors: Woo-Sung Hwang; Hee-Suk Oh, both of Seoul; Eui-Sik Kim, Paju, all of Rep. of Korea

[73] Assignee: Narae Corporation, Rep. of Korea

[21] Appl. No.: 08/899,194

[22] Filed: Jul. 23, 1997

[51] Int. Cl.⁷ .................................................. B23K 11/16
[52] U.S. Cl. ................... 219/91.21; 219/56.1; 219/56.22
[58] Field of Search ............................... 219/91.21, 56.1, 219/56.21, 56.22, 85.16, 137 R; 29/839; 313/440; 336/192

[56] References Cited

U.S. PATENT DOCUMENTS

| | | | |
|---|---|---|---|
| 3,519,778 | 7/1970 | Gibson, Jr. | 219/91.21 |
| 3,781,513 | 12/1973 | Bennett | 219/137 R |
| 4,675,639 | 6/1987 | Thaler et al. | 336/192 |
| 4,823,460 | 4/1989 | Groothoff et al. | 336/192 |
| 5,660,742 | 8/1997 | Warner et al. | 219/85.16 |

*Primary Examiner*—Clifford C. Shaw
*Attorney, Agent, or Firm*—Workman, Nydegger & Seeley

[57] ABSTRACT

A structure is provided by a welding method of connecting a connection terminal piece to lead wires extending from a deflection yoke coil for deflecting electron beams. The lead wires are led out from a winding body and consist of one or more conductive cores each of which has a coating layer of a self fusing layer and a high thermal-resistance insulation layer therearound. The welding method includes the steps of burning and eliminating said self fusing layer and said high thermal-resistance insulation layer of said lead wires from said conductive cores by heating through a burning method, and fusing and solidifying a filler metal wherein said filler metal is disposed between said connection terminal piece and said lead wires and has conductive and adhesive properties. The burnt materials of said self fusing layer and said high thermal-resistance insulation layer are extracted out of said lead wires during said burning and eliminating step. The fused and solidified filler metal fills the spaces between said conductive cores and said connection terminal piece, thereby welding said conductive cores and said connection terminal piece.

19 Claims, 4 Drawing Sheets

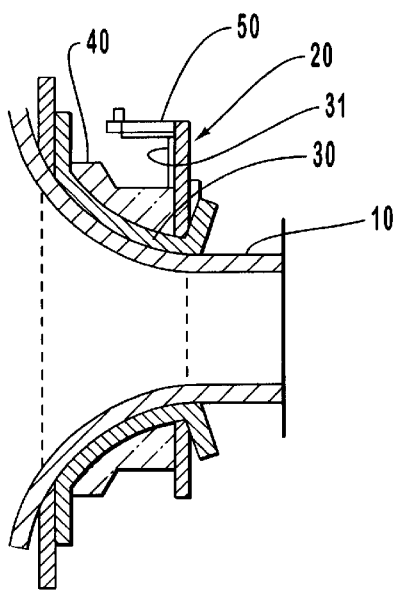

FIG. 1
(PRIOR ART)

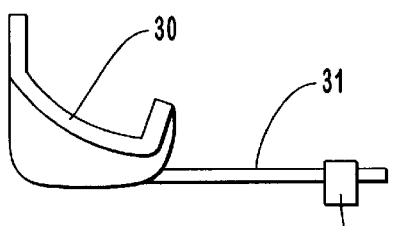

FIG. 3(a)
(PRIOR ART)

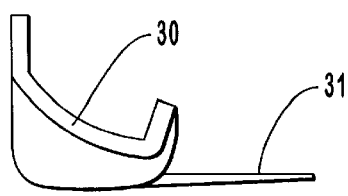

FIG. 3(b)
(PRIOR ART)

```
┌─────────────────────────────────┐
│ WELD A CONNECTION TERMINAL PIECE│
│      TO CORES OF LEAD WIRES     │
│  ┌───────────────────────────┐  │
│  │     BURN AND ELIMINATE    │  │
│  │     THE COATING LAYERS    │  │
│  ├───────────────────────────┤  │
│  │WELD A CONNECTION TERMINAL │  │
│  │PIECE TO CORES OF LEAD WIRES│ │
│  └───────────────────────────┘  │
└─────────────────────────────────┘
                ⇩
┌─────────────────────────────────┐
│     PATTERN DEFLECTION YOKE     │
│     COIL INTO WINDING BODY      │
└─────────────────────────────────┘
                ⇩
┌─────────────────────────────────┐
│     CUT OUT OF THE CONNECTION   │
│         TERMINAL PIECE          │
└─────────────────────────────────┘
                ⇩
┌─────────────────────────────────┐
│     BURN THE COATING LAYERS     │
│   OF AN END PORTION OF LEAD     │
│  WIRES FOR THE DEFLECTION COIL  │
└─────────────────────────────────┘
                ⇩
┌─────────────────────────────────┐
│  ELIMINATE THE COATING LAYERS   │
│   OF AN END PORTION OF LEAD     │
│  WIRES FOR THE DEFLECTION COIL  │
└─────────────────────────────────┘
                ⇩
┌─────────────────────────────────┐
│        WIND THE CORES           │
│       OF THE LEAD WIRES         │
│    FOR THE DEFLECTION COIL      │
└─────────────────────────────────┘
                ⇩
┌─────────────────────────────────┐
│     SOLDER A CONNECTION         │
│   TERMINAL PIN INTO FUSED       │
│          LEAD (PB)              │
└─────────────────────────────────┘
```

FIG. 2
(PRIOR ART)

WELDING METHOD OF A CONNECTION TERMINAL PIECE FOR A DEFLECTION YOKE COIL AND THE STRUCTURE THEREOF

BACKGROUND OF THE INVENTION

1. Field of the Invention

The present invention relates to a welding method of a connection terminal piece to an end portion of lead wires which are led out from a deflection yoke coil for deflecting electron beams of cathode ray tubes in all types of color picture tube devices such as TV sets and monitors of personal computers, or which are led from any magnetic field generating assembly which comprises a winding of one or more lead wires each of which consists of a core having a coating layer of a high thermal-resistant insulation layer and a self fusing adhesive layer. More particularly, the present invention relates to a welding method of a connection terminal piece for a deflection yoke coil and the structure thereof for maintaining an optimal welding condition in order to provide a good conduction between the cores of the lead wires and the connection terminal piece, as well as being capable of mass production due to reduction in number of manufacturing processes to be performed for the connection terminal piece and also being possibly performed by a mechanically automated system capable of performing the entire processes for manufacturing a deflection yoke coil.

2. Background Information

In prior art, a manufacturing method of a deflection yoke coil or a magnetic field generating assembly generally comprises steps of winding one or more wire bundles on a winding tool in order for the wire bundles to be formed in a desired shape. The respective wire bundle is made of one or more properly twisted lead wires each of which consists of a core having a coating layer of a self fusing layer and a high thermal-resistance insulation layer therearound. The formed wire bundle is patterned into a winding body by a fusing method through heating by means of electric conduction. Specifically, the patterning step comprises substeps of maintaining the wire bundle in a wound status; hardening the wire bundle; and plasticising the wire bundle. The process for patterning the winding body may be performed mechanically and automatically by an automated winding system.

In the prior art as shown in FIG. 1, one deflection yoke coil 30, which is a sort of a winding body consisting of one or more wire bundles, surrounds around a deflection yoke 20 which is fixed to a neck portion 10 of, e.g., a Braun tube, and is integrally combined with a ferrite core 40. The deflection yoke coil 30 is electrically connected to a printed circuit board 50 for the deflection yoke 20, through an end portion of lead wires 31 which are led out from one or more wire bundles for the deflection yoke coil 30. The lead wires 31 may also be used as a power connection terminal for supplying electric current to a winding body when performing a process for patterning the winding body by a fusing method through heating by means of electric conduction as described above.

As also described above, the lead wires 31 for providing an electrical connection for the deflection yoke coil 30, each of which is made of a core having a coating layer of a self fusing layer and a high thermal-resistance insulation layer therearound, have a properly twisted form. The end portion of the lead wires 31 is connected to a connection terminal piece 32 in order to permit the lead wires 31 to be used in an automated streamline of a winding system, i.e., more specifically, in order to connect the lead wires 31 to a pair of clipper-type power supply terminals set up at a predetermined position in the automated streamline and thereafter to align the lead wires 31 to each other and connect them to a printed circuit board to be in a conductive condition.

FIG. 3a shows an embodiment of a known deflection yoke coil having a connection terminal piece. Referring to FIG. 3a, a connection terminal piece 32 is welded to an end portion of the lead wires 31 which are led out from a winding body of the deflection yoke coil 30. The welding of the terminal piece 32 to the end portion of the lead wires 31 can be performed by a typical spot-welding method. More particularly, a self fusing layer and an insulation layer of the lead wires 31, where the respective outer surface of the lead wires has a coating layer of both a high-thermal resistance insulation layer and a self fusing layer thereon (both insulation layer and self fusing layer are hereinafter referred to as "a coating layer"), are eliminated by a burning method which will be described in detail below and then the lead wires 31 are aligned with each other. The aligned lead wires 31 are wrapped up with the connection terminal piece 32 having a narrow-folded band form. Then, the connection terminal piece 32 is welded to the lead wires 31 by a pressure-welding method, where heat generated from electric current between a positive electrode rod and a negative electrode rod of the spot-welding machine is used for welding the connection terminal piece 32 to the lead wires 31 as the electrode rods make a pressure on the connection terminal piece 32.

In the prior art described above, the connection terminal piece 32 which is welded to the lead wires 31 is cut out from the lead wires 31 by a separate cutting process, after completion of the process for patterning the winding body in order to provide for a power supply terminal. Then, as shown in FIG. 3b, the coating layer of the end portion of the remaining lead wires 31 without the connection terminal piece 32 is eliminated by a burning method. More detailed explanation will be described below, with reference to FIGS. 4 and 5.

FIG. 4 shows an enlarged view of a prior art structure where a connection terminal piece is welded to the end portion of one or more lead wires for a deflection yoke coil. FIG. 5 shows an enlarged cross-sectional view of a lead wire. As shown in FIG. 5, one lead wire 31-1 consists of a core 31-2 having a coating layer of a high thermal-resistant insulation layer 31-3 and a self fusing layer 314. A core 31-2 may be made of copper or an alloy containing copper. The insulation layer 31-3 surrounds the core 31-2, and the self fusing layer 314 surrounds the insulation layer 31-3. After the respective insulation layers and the self fusing layers are eliminated from lead wires by a burning method through heating at high temperature, the remaining cores of the lead wires for the deflection yoke coil are re-processed as a connection terminal for electric connection of the cores to the printed circuit board 50 for the deflection yoke 20, as shown in FIG. 1. However, in this prior art, it is difficult to easily perform the process for eliminating the coating layer by a burning method.

Further, it is practically impossible to use the cut-off lead wires 31 having the connection terminal piece 32 as a connection terminal for connecting the cores of the lead wires 31 to the printed circuit board 50. This is because there may be a high possibility that the contact surfaces (conductive area) between the cores and the connection terminal piece 32 are partially non-uniform so that the connection condition between the lead wires 31 and the connection terminal piece 32 is very unstable. In addition, in the prior art technology, there exist problems such as undesirable power supply through the contact surfaces between the cores and the connection terminal piece 32, instability when patterning a winding body of the deflection yoke coil 30, and as a result non-uniformly fused adhesion of the deflection yoke coil to the winding body. Another problem in the prior art technology is that a deflection yoke coil is subject to being damaged so that a corona discharge may occur at the electric connection portion if an undesirably fused deflection yoke coil is used, because electric power is supplied to the deflection yoke coil usually by a power source operating at a high frequency. There are further problems in the prior art technology that the path of electrons emitted from an electron gun cannot be exactly controlled due to using a non-uniformly fused adhesion of the deflection yoke coil to the winding body so that picture quality has been lowered, which would influence an adverse effect to the quality of any electric items employing this faulty deflection yoke coil.

Now returning to FIG. 2, a flow-chart for prior art processes for manufacturing a deflection yoke coil is illustrated. The example shown in FIG. 2 will be described starting from a step of welding a connection terminal piece to the lead wires, which is prior to the step of patterning a winding body after making lead wires 31 to be wound on a winding tool in a desired winding body. The lead wires which are led out from the winding body are wrapped up, at a predetermined position thereof, by a connection terminal piece having a narrow-folded band form. Then, the connection terminal piece is welded to the lead wires by a spot-fusing method known in the art, where upper and a lower portions of the connection terminal piece are pressed by a positive electrode rod and a negative electrode rod of a spot-welding machine (not shown). The welding process of the connection terminal piece is terminated by connecting the connection terminal piece to the cores of the lead wires through a welding method, after the respective high thermal-resistant insulation layers and self fusing layers (referred to 31-4 and 31-3 in FIG. 5) of the lead wires are burnt down and eliminated sequentially by heating at a high-temperature through electric current derived from the electrode rods. After that, a process of patterning the winding body is performed where the lead wires led out from the wiring body for a deflection yoke coil are connected to clipper-type power supply terminals so that the respective self fusing layers of the lead wires are fused to be self bonded to each other by a heating method through electric current. After completing the patterning process of the winding body, a cutting out process is completed by cutting out an end portion of the lead wires being disposed at a position between the deflection yoke coil and the connection terminal piece and proximate to the connection terminal piece.

Following the cutting-out process, a burning process is performed where the respective coating layers at the remaining end portion of the lead wires without the connection terminal piece are eliminated by a burning method. An example of the burning method may be one of a stripping method, a heating method with a high frequency induction, a soldering method, a heater method or a spot-welding method, etc., all of which are known to a person skilled in the art. Even after completion of the burning process, burnt residues of the respective coating layers still exist at the end portion of the remaining lead wires and thus a clearing process for eliminating the burnt resides forcibly by using, e.g., a rotatable brush, etc. is performed.

As a result of the clearing process, the cores at the end portion of the lead wires are exposed. Then, a core winding process is performed where the exposed cores are tied up by a manual winding method to a connection terminal pin which is formed on a printed circuit board for the deflection yoke coil. Then, the core portion of the remaining lead wires that protrudes outward from the connection terminal pin is also cut out. After that, an immersion-type soldering process is performed where the connection terminal pin wound by the cores of the remaining lead wires is immersed into fused lead (Pb). Thus, manufacturing processes of a deflection yoke coil are completed.

As can be seen from the above description, the manufacturing process of a deflection yoke coil in the prior art needs several steps to be performed. As a result, prior art manufacturing of a deflection yoke coil takes a relatively long period of time and results in relatively low productivity. These factors cause a high manufacturing cost and a weak competitiveness in price.

In addition, an environmental condition in terms of sanitation in a factory becomes poorer due to an occurrence of dust during the clearing process of the burnt residues residing around the cores of the lead wires. Further, the conductivity of the lead wires may become poorer due to an oxidation thereof Also, soldering may be made frequently in a poor condition, which will lead to an adverse effect on the quality of the deflection yoke and any electric items employing the deflection yoke. More particularly, there is a severe problem in the prior art that because the core winding process for electrically connecting the exposed cores to the connection terminal pin formed on a printed circuit board can be performed only through manual working, the connection work is very difficult. Therefore, it is substantially impossible to accomplish a full automation for performing the entire processes for manufacturing a deflection yoke coil mechanically and automatically.

SUMMARY OF THE INVENTION

The present invention has an object to provide a new welding method of a connection terminal piece for a deflection yoke coil and a structure thereof where lead wires are connected, by a typical braze method, to the connection terminal piece using a filler material having a fusing temperature lower than that of a connection terminal piece and higher than that of a coating layer of the lead wires for the deflection yoke coil and having a superior conductivity and permeability.

The present invention has another object to provide a welding method of a connection terminal piece for a deflection yoke coil and a structure thereof where the connection terminal piece, which can not be available in the prior art, is available for being used both as a conduction terminal when patterning a winding body for manufacturing a deflection yoke coil and a connection terminal for electrically connecting the connection terminal piece to a printed circuit board for a deflection yoke coil.

The present invention has another object to provide a welding method of a connection terminal piece for a deflection yoke coil and a structure thereof where high productivity and mass production with lower manufacturing cost can be achieved by reducing some steps necessary for performing the manufacturing processes of a deflection yoke coil.

The present invention has an object to provide a welding method of a connection terminal piece for a deflection yoke coil and a structure thereof where a mechanical automation for manufacturing a deflection yoke coil can be implemented using a connection terminal piece by connecting the connection terminal piece directly into a printed circuit board.

In order to accomplish the objects described above, a welding method of connecting a connection terminal piece to lead wires is provided. The lead wires are led out from a winding body and consist of one or more conductive cores each of which have a coating layer of a self fusing layer and a high thermal-resistance insulation layer therearound. The welding method comprises steps of burning and eliminating said self fusing layer and said high thermal-resistance insulation layer of said lead wires from said conductive cores by heating through a burning method; and fusing and solidifying a filler metal wherein said filler metal is disposed between said connection terminal piece and said lead wires and has conductive and adhesive properties. The burnt materials of said self fusing layer and said high thermal-resistance insulation layer are extracted out of said lead wires during said burning and eliminating step. The fused and solidified filler metal fills the spaces between said conductive cores and said connection terminal piece, thereby welding said conductive cores and said connection terminal piece.

In addition, a welding structure in accordance with the present invention comprises one or more lead wires comprising only conductive cores from which self fusing layers and high thermal-resistance insulation layers are eliminated. The end portions of said conductive cores are aligned with each other and a connection terminal piece is connected to the near of said lead wires. A filler metal is fused and solidified so as to fill the spaces between said conductive cores and said connection terminal piece, thereby welding said conductive cores and said connection terminal piece.

With the welding method of a connection terminal piece and the structure thereof according to the present invention, an optimal welding condition between the connection terminal piece and the lead wires can be obtained while good conductivity therebetween is maintained; productivity may be greatly increased due to a substantial decrease in number of the processes necessary for manufacturing a deflection yoke coil, and the processes for manufacturing a deflection yoke coil can be performed by a fully automated mechanical system.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 is a schematic view of a deflection yoke according to a prior art.

FIG. 2 is a flow-chart showing manufacturing processes for a deflection yoke coil according to a prior art, starting after a winding process of one or more lead wires for a deflection yoke coil.

FIG. 3a is side view of a deflection yoke coil having an input/output connection terminal piece for supplying electric current at the end portion of lead wires led out therefrom in order to perform a process of patterning a winding body for the deflection yoke coil, consisting of one or more wire bundles on a winding tool, into a desired shape by fusing self fusing layers of the lead wires through heating from electric current via the lead wires, after winding the wire bundles in a shape of a deflection yoke coil, according to a prior art.

FIG. 3b is a side-view of a deflection yoke coil showing that after completion of the patterning process for a deflection yoke coil, cutting out of the connection terminal piece is made at the end portion of the lead wires and then the respective coating layers of the lead wires are eliminated to expose the cores thereof, according to a prior art.

DETAILED DESCRIPTION OF THE INVENTION

Figure 4:
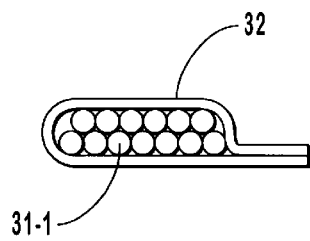
FIG. 4 is an enlarged cross-sectional view of a structure wherein a connection terminal piece is welded to the end portion of the lead wires for a deflection yoke coil, according to a prior art.
Figure 5:
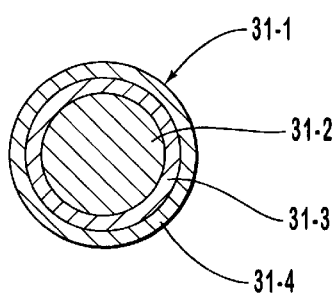
FIG. 5 is a cross-sectional view of one lead wire having a high thermal-resistant insulation layer covered with a self fusing adhesive layer.
Figure 6:
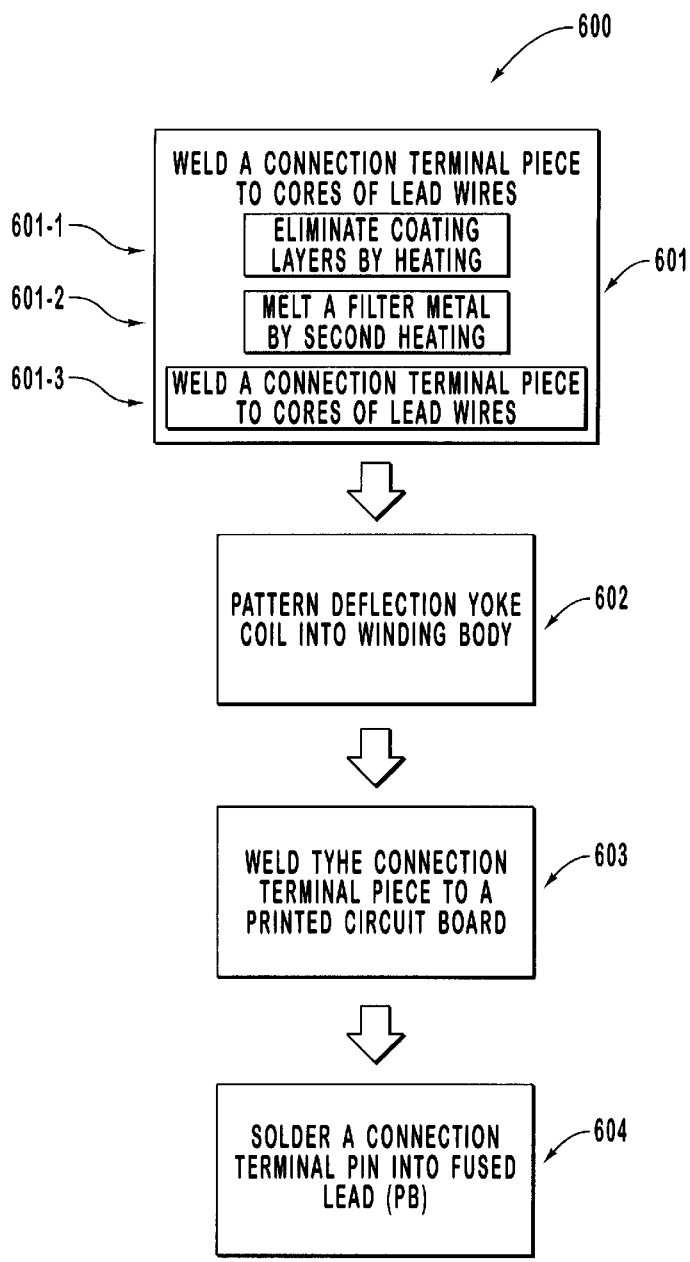
FIG. 6 is a flow-chart which shows manufacturing processes for a deflection yoke coil, according to the present invention.

FIG. 6 is a flow-chart which shows manufacturing processes for a deflection yoke coil, according to the present invention. One important point in a welding method according to the present invention is that a filler metal having a fusing temperature different from that of the respective coating layers of the lead wires be used when performing a welding process of the connection terminal piece to the lead wires. The filler metal may be, for example, an alloy of phosphorus, silver, and copper, which is well know in the art. In a welding method according to the present invention, a clearing process for eliminating the respective coating layers (i.e., the respective self fusing layers plus high thermal-resistant insulation layers) of the lead wires for a deflection yoke coil is first performed. This step is accomplished by burning the lead wires at a first temperature which is higher than the fusing temperature of the coating layer but is lower than the fusing temperature of the filler metal. Then, a welding process for welding the connection terminal piece to the lead wires is performed at a second temperature which is higher than the fusing temperature of the filler metal.

The present invention will be explained in more detail with reference to FIG. 6. Step 601 consists of three substeps: 601-1, 601-2 and 601-3. In substep 601-1, the respective coating layers of the lead wires are burnt and eliminated to expose the cores thereof. This is accomplished by a first heating of the lead wires derived from an electric current between the positive and negative electrode rods of a spot-welding machine (not shown). In a preferred embodiment of the present invention, a heat produced by the first heating corresponds to a first temperature within a range between about 350° C. to about 400° C. The burnt material of the coating layers is extracted out from the welded portion as a desired pressure is applied on the connection terminal piece by the electrode rods. After that, in substep 601-2, a fusing process for fusing the filler metal is performed by heating the filler metal disposed between the connection terminal piece and the lead wires, at a second temperature within a range of between about 600° C. to about 650° C. Then, in substep 601-3, the connection terminal piece and the cores of the lead wires are welded and thus connected together by the fused filler metal. As a result of extraction of the burnt material and welding the terminal piece to the cores of the lead wires by the fused filler material, a practical and sufficient conductivity between the terminal piece and the cores is obtained.

Then, in step 602, a process for patterning a winding body for a deflection yoke coil is performed by a typical method. More specifically, the connection terminal piece is welded to the lead wires and connected to clipper-type power supply terminals of a winding system by a heating method through electric current. As a result, the respective self fusing layers of the lead wires are fused to be self bonded to each other. Then, in step 603, the connection terminal piece is connected to a printed circuit board for the deflection yoke coil by a proper method such as a direct insertion method or other known methods. As can be seen from step 603, the patterning process according to the present invention does not need a process for cutting out the connection terminal piece which is provided as a conduction terminal for performing the patterning process, which is necessarily required in the prior art as described above. After completion of step 603, a process for soldering the connection terminal piece is performed in step 604 in order to connect the connection terminal piece to the printed circuit board by an immersion-type soldering method. The manufacturing processes for a deflection yoke coil are completed after the completion of the soldering process in step 604. It is possible that the time required for performing each of the manufacturing processes of the present invention is controlled by imposing proper times which may vary depending on the respective processes by means of separate control circuits.

Figure 7:
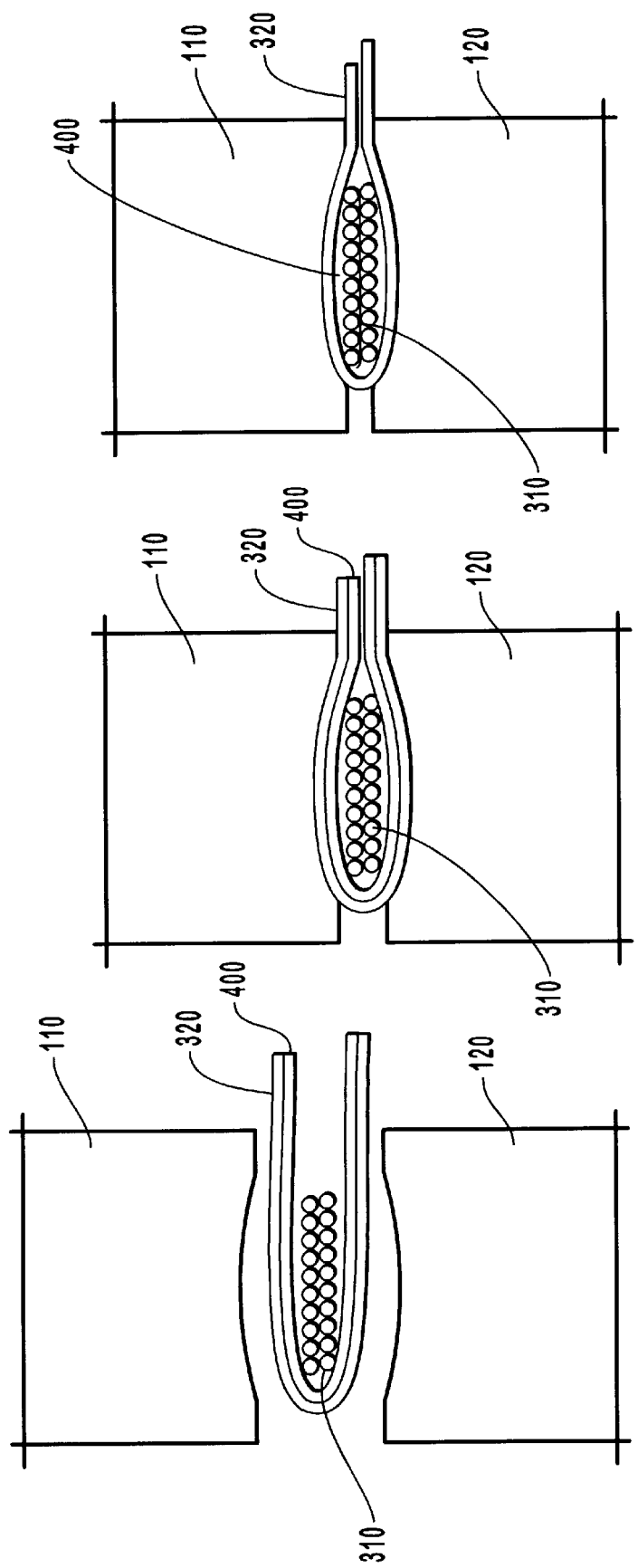
FIG. 7a is an embodiment illustrating a process that a connection terminal piece, a deflection yoke coil and a filler metal are initially provided between a welding device so that the connection terminal piece is welded at the end portion of the lead wires for the deflection yoke coil, according to the present invention
FIG. 7b is an embodiment illustrating a process that the respective self fusing adhesive layers and high thermal-resistant insulation layers are burnt and eliminated by a first heating after contacting the positive and negative electrode rods of the welding device with the connection terminal piece so that the connection terminal piece is welded at the end portion of the lead wires for the deflection yoke coil, according to the present invention.
FIG. 7c is an embodiment illustrating a process that the filler metal is fused by a second heating derived from electric current of the positive and the negative electrode rods of the welding device so that the connection terminal piece is welded at the end portion of the lead wires for the deflection yoke coil, according to the present invention.

FIG. 7 shows processes for welding a connection terminal piece according to the present invention. In FIG. 7a, a structure is shown where one or more lead wires 310 for a deflection yoke coil is wrapped up by the connection terminal piece 320 between the positive electrode rod 10 and the negative electrode rod 102 of a spot-welding machine (not shown). The structure indicates an initial status of the welding process. In FIG. 7a, a filler metal 400 which has the same as or a slightly smaller size than that of the connection terminal piece, is formed on an inner surface of the connection terminal piece having a U-type shape. The filler metal 400 may be supplied separately from the connection terminal piece 320 or supplied in a status being combined integrally with the connection terminal piece 320. In FIG. 7b, the respective coating layers of the lead wires are eliminated by a burning method through heating at a first temperature for a predetermined time. Heating at the first temperature is produced from electric current between the positive and negative electrode rods 110 and 120 of a spot-welding machine. Then, in FIG. 7c, a welding process is performed by fusing the filler metal 400 through heating at a second temperature.

Figure 8:
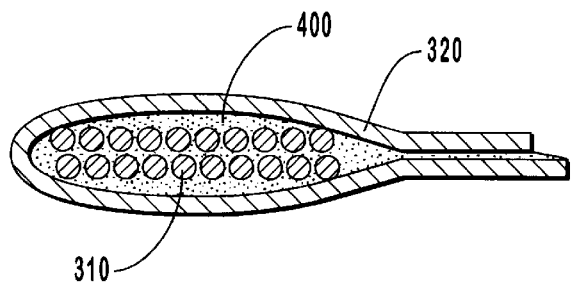
FIG. 8 is an enlarged view of a structure after completion of welding processes shown in FIG. 7, according to the present invention.

FIG. 8 shows a welding structure where the connection terminal piece is welded to the cores of the lead wires, according to the present invention. The welding structure of the connection terminal piece includes a fused and solidified filler metal having a good conductivity between the connection terminal piece 320 and the cores of the lead wires 310. An immersion of the fused filler metal among the lead wires provides a fully conductive contact area and a strong adhesive characteristic therebetween. An additional advantage in accordance with the present invention is that a small amount of the burnt residues of the respective coating layers, still existing at the end portion of the lead wires after the burning process, can be extracted out together with extraction of the fused filler metal.

Figure 10:
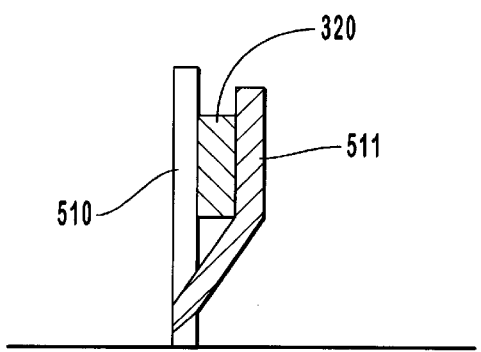
FIG. 10 is an enlarged cross-sectional view taken along line A—A in FIG. 9, which shows that the connection terminal piece welded at the end portion of the lead wires is combined, by an insertion method, with an input terminal led out from the printed circuit board.
Figure 9:
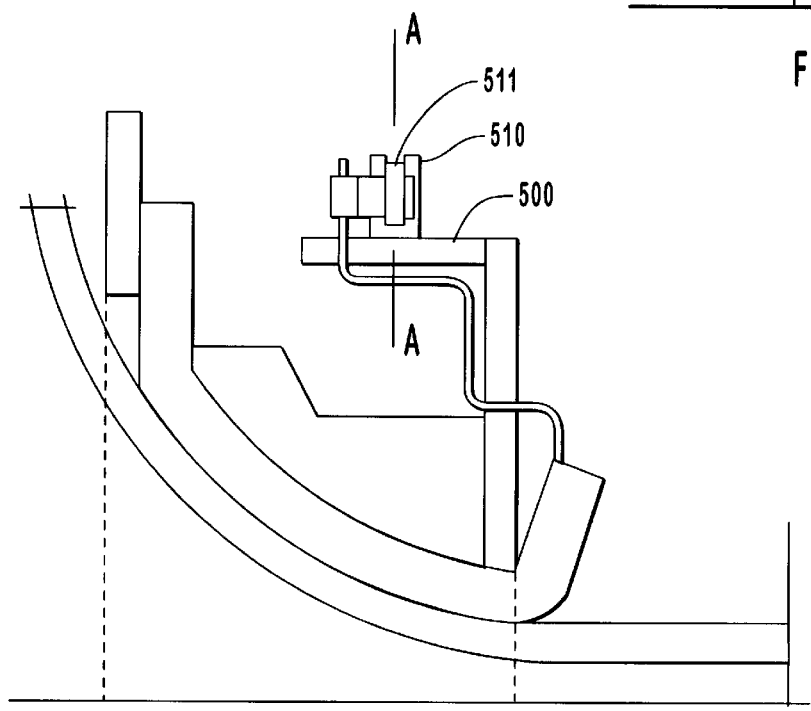
FIG. 9 is a view showing a structure wherein a connection terminal piece which is welded at an end portion of the lead wires for deflection yoke coil, according to the present invention, is used as a connection terminal for providing an electric connection of the connection terminal piece to a printed circuit board for the deflection yoke coil.

FIG. 9 shows that an electrical contact is achieved by direct insertion of the connection terminal piece 320 into a connection terminal pin 510 formed on a printed circuit board 500. More specifically, the printed circuit board 500 is in a plate form and includes the connection terminal pin 510 thereon. The connection terminal pin 510 is separated into triple parts at the top portion thereof. The outer two parts from the triple parts form a connecting element 511 by being bent relative to the remaining central part thereof which leads to provide a space enough to receive the connection terminal piece 320, as shown in FIG. 10. In this manner, the connection terminal piece 320 can be easily connected electrically, using the connection element 511, into the connection terminal pin 510, by, e.g., simple insertion method.

In accordance with the present invention as described in detail above, an occurrence of unnecessary electric load and current can be prevented by maintaining an optimal welding condition where welding surfaces between the connection terminal and the lead wires remain in a uniform condition and the total welded area can be used for providing a good conduction area. In addition, another advantage of the present invention is that picture quality and quality of any electric items employing a deflection yoke coil manufactured in accordance with the present invention are substantially improved. Further, it is possible to actively prevent the unnecessary loss of parts because the connection terminal piece can be used as a passage for supplying electric power only and cannot be available for another usage after cutting out from the end portion of the lead wires in the prior art, while being possibly used as a connection terminal between the connection terminal piece and the printed circuit board in accordance with the present invention. The present invention also has an advantage that mass production of the deflection yoke coil is obtainable because, due to using a filler metal, the manufacturing processes therefor are simplified and the productivity is increased by reducing the processes necessarily required for manufacturing the deflection yoke coil in the prior art. Another advantage in accordance with the present invention is that the entire processes for manufacturing a deflection yoke coil can be performed by a mechanically automated system.

While the present invention as herein disclosed and shown in detail are fully capable of obtaining their objects and advantages stated above, it is to be understood that some are merely illustrative of the presently preferred embodiments of the present invention and that no limitations are intended to the details of structure or design or method herein disclosed other than described in the appended claims.

What is claimed is:

1. A welding method of connecting a connection terminal piece to lead wires being led out from a winding body and consisting of one or more conductive cores each of which has a coating layer of a self fusing layer and a high thermal-resistance insulation layer therearound, comprising the steps of:

burning and eliminating said self fusing layer and said high thermal-resistance insulation layer of said lead wires from said conductive cores by heating through a burning method;

fusing and solidifying a filler metal, wherein said filler metal is disposed between said connection terminal piece and said lead wires and has conductive and adhesive properties; and the burnt materials of said self fusing layer and said high thermal-resistance insulation layer are extracted out of said lead wires during said burning and eliminating step, and the fused and solidified filler metal fills the spaces between said conductive cores and said connection terminal piece, thereby welding said conductive cores and said connection terminal piece.

2. The welding method according to claim 1, wherein the melting temperature of said filler metal is higher than each of the fusing temperatures of both said self fusing layer and said high thermal-resistance insulation layer of said lead wires.

3. The welding method according to claim 1, wherein each of said fusing temperatures of said self fusing layer and said high thermal-resistance insulation layer has a range approximately from 350 to 400° C., and the melting temperature of said filler metal has a range approximately from 600 to 650° C.

4. The welding method according to claim 1, wherein said burning method is a method selected from a group consisting of a striping method, a heating method with a high frequency induction, a soldering method, a heater method or a spot-welding method.

5. The welding method according to claim 4, wherein each conductive core is made of copper or an alloy containing copper.

6. The welding method according to claim 4, wherein said filler metal is made of an alloy consisting of phosphorus, silver and copper.

7. The welding method according to claim 1, wherein each conductive core is made of copper or an alloy containing copper.

8. The welding method according to claim 1, wherein said filler metal is made of an alloy consisting of phosphorus, silver and copper.

9. A welding structure comprising:

one or more lead wires comprising only conductive cores present after eliminating self fusing layers and high thermal-resistance insulation layers therearound, wherein the end portions of said conductive cores are aligned with each other;

a connection terminal piece being connected to the outer surface of said lead wires and being located adjacent to one end of said lead wires;

a filler metal having conductive and adhesive properties; and said filler metal is fused and solidified so as to fill the spaces between said conductive cores and said connection terminal piece, thereby welding said conductive cores and said connection terminal piece.

10. The welding structure according to claim 9, wherein said connection terminal piece is a connection terminal for being electrically connected to a printed circuit board for a deflection yoke coil.

11. The welding structure according to claim 10, wherein said printed circuit board includes a connection terminal pin, and wherein said connection terminal piece is inserted into said connection terminal pin by a direct insertion method in order to make an electrical connection therebetween.

12. The welding structure according to claim 11, wherein said connection terminal pin is separated into triple parts at the top portion thereof, and outer two parts from said triple parts form a connecting element by being bent relative to a remaining central part thereof in order to provide space enough to receive said connection terminal piece.

13. A welding structure, comprising:

one or more lead wires each having a main body portion and a first end, each of said one or more lead wires including one or more self fusing layers and one or more high thermal-resistance layers surrounding a conductive core, said first end of said lead wires having said self fusing layers and said high thermal-resistance layers substantially removed, said first end of said lead wires being generally aligned with each other;

a connection terminal piece; and a filler material having conductive and adhesive properties, said filler material being used to connect said conductive cores of said lead wires to said connection terminal piece, said filler material substantially filling one or more spaces between said conductive cores and said connection terminal piece;

wherein said self fusing layers and said high thermal resistance layers are substantially removed from said spaces between said conductive cores and said connection terminal piece.

14. The welding structure according to claim 13, wherein said self fasting layers and said high thermal-resistance layers are substantially removed from said spaces between said conductive cores and said connection terminal piece such that there is great uniformity in said connection of said conductive cores and said connection terminal piece.

15. The welding structure according to claim 14, wherein said connection of said conductive cores and said connection terminal piece is configured to withstand a flow of a high current and achieve a high degree of conductivity.

16. The welding structure according to claim 13, wherein said filler material has a melting temperature lower than a melting temperature of said connection terminal piece and a melting temperature higher than fusing temperatures of said self fusing layers and said high thermal-resistance layers.

17. The welding structure according to claim 16, wherein said fusing temperatures of said self fusing layers and said high thermal-resistance layers are in a range of approximately 350° C. to approximately 400° C. and the melting temperature of said filler material is in a range of approximately 600° and approximately 650° C.

18. The welding structure according to claim 13, wherein said self fusing layers and said high thermal-resistance layers are removed from said first end of said lead wires by burning.

19. The welding structure according to claim 13, wherein said self fusing layers and said high thermal-resistance layers are removed at a first temperature and said conductive cores of said lead wires are connected to said connection terminal piece at a second temperature, said second temperature being higher than said first temperature.

* * * * *

UNITED STATES PATENT AND TRADEMARK OFFICE
CERTIFICATE OF CORRECTION

PATENT NO. : 6,011,233

DATED : January 4, 2000

INVENTOR(S) : Woo-Sung Hwang, Hee-Suk, Oh, Eui-Sik Kim

It is certified that error appears in the above-identified patent and that said Letters Patent are hereby corrected as shown below:

Col. 2, ln. 46: after "layer" change "314" to --31-4--

Col. 2, ln. 49: after "layer" change "314" to --31-4--

Col. 3, ln. 31: after "and" and before "lower" delete [a]

Col. 6, ln. 66: after "well" change "know" to --known--

Col. 7, ln. 63: after "rod" change "10" to --110--

Col. 7, ln. 64: after "rod" change "102" to --120--

Col. 9, ln. 43: after "claim" change "4" to --1--

Col. 9, ln. 46: after "claim" change "4" to --1--

Col. 9, ln. 49: after "claim" change "1" to --4--

UNITED STATES PATENT AND TRADEMARK OFFICE
CERTIFICATE OF CORRECTION

PATENT NO. : 6,011,233
DATED : January 4, 2000
INVENTOR(S) : Woo-Sung Hwang, Hee-Suk, Oh, Eui-Sik Kim Page 2 of 2

It is certified that error appears in the above-identified patent and that said Letters Patent is hereby corrected as shown below:

Col. 10, ln. 38: after "self" change "fasting" to --fusing--

Signed and Sealed this

Seventeenth Day of April, 2001

Attest:

NICHOLAS P. GODICI

*Attesting Officer*   *Acting Director of the United States Patent and Trademark Office*